United States Patent
Bezbaruah et al.

(10) Patent No.: US 9,875,160 B2
(45) Date of Patent: *Jan. 23, 2018

(54) EFFICIENTLY PROVIDING VIRTUAL MACHINE REFERENCE POINTS

(71) Applicant: MICROSOFT TECHNOLOGY LICENSING, LLC, Redmond, WA (US)

(72) Inventors: Angshuman Bezbaruah, Redmond, WA (US); Lars Reuther, Kirkland, WA (US); Taylor O'Neil Brown, Bellevue, WA (US); John Andrew Starks, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,958

(22) Filed: Jul. 26, 2016

(65) Prior Publication Data

US 2017/0109240 A1  Apr. 20, 2017

Related U.S. Application Data

(63) Continuation of application No. 14/573,976, filed on Dec. 17, 2014, now Pat. No. 9,430,272.

(51) Int. Cl.
*G06F 9/455* (2006.01)
*G06F 11/14* (2006.01)
*G06F 3/06* (2006.01)

(52) U.S. Cl.
CPC .......... *G06F 11/1451* (2013.01); *G06F 3/065* (2013.01); *G06F 3/067* (2013.01);
(Continued)

(58) Field of Classification Search
CPC ........ G06F 3/0619; G06F 3/065; G06F 3/067; G06F 9/45558; G06F 11/1451; G06F 2201/84
(Continued)

(56) References Cited

U.S. PATENT DOCUMENTS 5,721,915 A   2/1998   Sockut et al.
6,411,964 B1  6/2002   Iyer et al.
(Continued)

FOREIGN PATENT DOCUMENTS

CN   103946807 A   7/2014

OTHER PUBLICATIONS

Zhang et al., "Optimizing VM Checkpointing for Restore Performance in VMware ESXi", 2013, USENIX Annual Technical Conference, 12 pages.*
(Continued)

*Primary Examiner* — Ted T Vo
(74) *Attorney, Agent, or Firm* — Workman Nydegger

(57) ABSTRACT

A computer system maintains identifiers that identify changed blocks of virtual machine (VM) storage. The computer system accesses a stable VM checkpoint comprising a restorable VM image at a time, and that stores a representation of data of at least one block as it existed at the time. The computer system converts the checkpoint to a reference point. Reference point information is transferable with the VM, such that if the VM is moved to a different computing system, any data identified by the reference point is recoverable. The conversion includes querying the storage to determine an identifier corresponding to the block of the checkpoint at the time, storing this identifier as a part of the reference point, and releasing the representation of the data
(Continued)

of the block from the checkpoint. The computer system then uses the reference point to identify changes in the blocks of the storage since the time.

20 Claims, 3 Drawing Sheets

(52) U.S. Cl.
CPC ........ G06F 3/0619 (2013.01); G06F 9/45558 (2013.01); G06F 2201/84 (2013.01)

(58) Field of Classification Search
USPC ..................................... 717/101–103; 718/1
See application file for complete search history.

(56) References Cited

U.S. PATENT DOCUMENTS

| | | |
|---|---|---|
| 6,795,966 B1 | 9/2004 | Lim et al. |
| 6,981,114 B1 | 12/2005 | Wu et al. |
| 7,162,662 B1 | 1/2007 | Svarcas et al. |
| 7,249,262 B2 | 7/2007 | Hauck et al. |
| 7,328,366 B2 | 2/2008 | Michelman |
| 7,447,854 B1 | 11/2008 | Cannon |
| 7,516,286 B1 | 4/2009 | Dalai et al. |
| 7,519,858 B2 | 4/2009 | Korlepara |
| 7,574,459 B2 | 8/2009 | Sen et al. |
| 7,860,837 B2 | 12/2010 | Ali et al. |
| 7,865,470 B2 | 1/2011 | Fries et al. |
| 8,055,613 B1 | 11/2011 | Mu et al. |
| 8,145,601 B2 | 3/2012 | Zizys et al. |
| 8,335,902 B1 | 12/2012 | Feathergill |
| 8,356,013 B2 | 1/2013 | Fachan et al. |
| 8,356,148 B2 | 1/2013 | Popovski et al. |
| 8,443,166 B2 | 5/2013 | Czezatke et al. |
| 8,463,747 B2 | 6/2013 | Wahlert et al. |
| 8,463,749 B2 | 6/2013 | Zizys et al. |
| 8,468,609 B2 | 6/2013 | Leggette |
| 8,538,919 B1 | 9/2013 | Nielsen et al. |
| 8,560,855 B2 | 10/2013 | Resch |
| 8,712,970 B1 | 4/2014 | Sim-Tang |
| 8,726,127 B2 | 5/2014 | Grube et al. |
| 8,726,273 B2 | 5/2014 | Le |
| 8,751,515 B1 | 6/2014 | Xing et al. |
| 8,782,086 B2 | 7/2014 | Resch |
| 8,788,773 B2 | 7/2014 | Goodman et al. |
| 8,805,788 B2 | 8/2014 | Gross, IV et al. |
| 8,813,204 B2 | 8/2014 | Leggette |
| 8,966,341 B2 | 2/2015 | Grube et al. |
| 9,081,714 B2 | 7/2015 | Grube et al. |
| 9,081,715 B2 | 7/2015 | Grube et al. |
| 9,086,994 B2 | 7/2015 | Resch |
| 9,130,957 B2 | 9/2015 | Yamaura et al. |
| 9,276,980 B2 | 3/2016 | Chan |
| 9,430,272 B2 * | 8/2016 | Bezbaruah .......... G06F 9/45558 |
| 2008/0126445 A1 | 5/2008 | Michelman |
| 2008/0140963 A1 | 6/2008 | Thomason et al. |
| 2010/0049929 A1 | 2/2010 | Nagarkar et al. |
| 2010/0228913 A1 | 9/2010 | Czezatke et al. |
| 2010/0262585 A1 | 10/2010 | Rosikiewicz et al. |
| 2010/0274980 A1 | 10/2010 | Stringham et al. |
| 2011/0167196 A1 | 7/2011 | Scales et al. |
| 2012/0072659 A1 | 3/2012 | Wade et al. |
| 2013/0067179 A1 | 3/2013 | Paleologu et al. |
| 2013/0254479 A1 | 9/2013 | Czezatke et al. |
| 2013/0290782 A1 | 10/2013 | Chen et al. |
| 2014/0025913 A1 | 1/2014 | Fuente et al. |
| 2014/0040572 A1 | 2/2014 | Kotagiri et al. |
| 2014/0164722 A1 | 6/2014 | Garthwaite et al. |
| 2014/0236892 A1 | 8/2014 | Blyler |
| 2014/0250347 A1 | 9/2014 | Grube et al. |
| 2014/0337666 A1 | 11/2014 | Resch et al. |
| 2014/0337932 A1 | 11/2014 | Leggette et al. |
| 2016/0179568 A1 | 6/2016 | Bezbaruah |
| 2016/0203052 A1 | 7/2016 | Starks et al. |

OTHER PUBLICATIONS

"Notice of Allowance Issued in U.S. Appl. No. 14/573,976", dated Jun. 7, 2016, 7 Pages.
"Notice of Allowance Issued in U.S. Appl. No. 14/595,047", dated Mar. 14, 2016, 11 Pages.
"Notice of Allowance Issued in U.S. Appl. No. 14/595,047", dated May 16, 2016, 9 Pages.
"International Search Report and Written Opinion Issued in PCT Application No. PCT/US2015/063565", dated Jun. 30, 2016, 20 Pages.
"International Search Report and Written Opinion Issued in PCT Application No. PCT/US2015/067761", dated May 24, 2016, 12 Pages.
Ramdas, Aashish, "Resynchronization of Virtual Machines in Hyper-V Replica", Retrieved from: <<https://blogs.technet.microsoft.com/virtualization/2013/05/10/resynchronization-of-virtual-machines-in-hyper-v-replica/>>, May 10, 2013, 5 Pages.
Garg, et al., "Checkpoint-Restart for a Network of Virtual Machines", In Proceedings of International Conference on Cluster Computing, IEEE, Sep. 23, 2013, 8 Pages.
Park, et al., "Fast and Space-Efficient Virtual Machine Checkpointing", In Proceedings of the 7th ACM SIGPLAN/SIGOPS International Conference on Virtual Execution Environments, Mar. 9, 2011, pp. 75-85.
Sinofsky, Steven, "Building the next generation file system for Windows: ReFS", Retrieved from: <<https://blogs.msdn.microsoft.com/b8/2012/01/16/building-the-next-generation-file-system-for-windows-refs/>>, Jan. 17, 2012, 45 Pages.
Werneburg, Ken, "VMware vSphere® Replication 5.5 Overview: Simple and Effective Virtual Machine Protection", In Technical White Paper, Nov. 16, 2013, 14 Pages.
"Advanced Restore—Virtual Server Agent for VMware", Retrieved from: <<https://documentation.commvault.com/commvault/v10/article?p=products/vs_vmware/restore_adv.htm>>, Retrieved on: Nov. 7, 2014, 32 Pages.
"Changed Block Tracking (CBT) on Virtual Machines (1020128)", Retrieved from: <<https://kb.vmware.com/selfservice/microsites/search.do?cmd=displayKC&docType=kc&externalId=1020128&sliceId=1&docTypeID=DT_KB_1_1&dialogID=155782394&stateId=0 0 160353152>>, Retrieved on: Nov. 7, 2014, 2 Pages.
"High Availability and Data Protection with EMC Isilon Scale-Out NAS", In White Paper, Nov. 2013, 36 Pages.
"What's New in Hyper-V for Windows Server 2012", Retrieved from: <<https://technet.microsoft.com/en-us/library/hh831410(v=ws.11).aspx>>, Feb. 29, 2012, 6 Pages.
"Non Final Office Action Issued in U.S. Appl. No. 14/573,976", dated Dec. 3, 2015, 10 Pages.
"International Preliminary Report on Patentability Issued in PCT Application No. PCT/US2015/063565", dated Mar. 24, 2017, 14 Pages.
Notice of Allowance dated Oct. 6, 2016 cited in U.S. Appl. No. 14/595,047.
"SecondWritten Opinion Issued in PCT Application No. PCT/US2015/063565", dated Jan. 13, 2017, 12 Pages.

* cited by examiner

EFFICIENTLY PROVIDING VIRTUAL MACHINE REFERENCE POINTS

CROSS REFERENCE TO RELATED APPLICATION

This application is a continuation of U.S. patent application Ser. No. 14/573,976, filed Dec. 17, 2014, and entitled "EFFICIENTLY PROVIDING VIRTUAL MACHINE REFERENCE POINTS," the entire contents of which are incorporated by reference herein in their entirety.

BACKGROUND

Computing systems have become ubiquitous, ranging from small embedded devices to phones and tablets to PCs and backend servers. Each of these computing systems is designed to process software code. The software allows users to perform functions, interacting with the hardware provided by the computing system. In some cases, these computing systems allow users to establish and run virtual machines. These virtual machines may provide functionality not provided by the host operating system, or may comprise a different operating system altogether. In this manner, virtual machines may be used to extend the functionality of the computing system. Virtual machines may be backed up on virtual storage devices which themselves may be backed up to physical or virtual storage devices. Virtual machine hosts may also be configured to take snapshots which represent point-in-time images of the virtual machine. The VM snapshots or "checkpoints" include CPU state, memory state, storage state and other information necessary to completely recreate or restore the virtual machine to that point in time.

BRIEF SUMMARY

Embodiments described herein are directed to establishing efficient virtual machine reference points and to specifying a virtual machine reference point to query incremental changes. As used herein, virtual machine reference points allow computer systems to identify incremental changes from specific points in time on. For example, in one embodiment, a computer system accesses a stable virtual machine checkpoint that includes portions of underlying data stored in data storage, where the checkpoint is associated with a specific point in time. The computer system then queries the data storage to determine data storage identifiers that reference the point in time associated with the checkpoint and stores the determined data storage identifiers as a virtual machine reference point or virtual machine reference point artifacts, where each subsequent change to the data storage results in an update to the data storage identifier, so that virtual machine reference point is usable to identify incremental changes from specific points in time on. Virtual machine reference point artifacts allow for cases where a virtual machine has two (or more) virtual disks. Each virtual disk may have a different identifier for the same point in time, and the reference point artifact allows the computer system to associate both of those points in time as a common point. This will be explained further below.

In another embodiment, a computer system performs a method for specifying a virtual machine reference point to query incremental changes. The computer system establishes a stable, unchanging state within a virtual machine, where the stable state is associated with a checkpoint that includes corresponding state data and storage data. The computer system accesses previously generated reference points to identify differences in virtual machine state between the current stable state and a selected past stable point in time. The computer system also replicates the differences in virtual machine state between the current stable state and a selected past stable point in time. The differences may be replicated to a data storage device as an incremental backup, or may be used for remote replication or disaster recovery purposes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
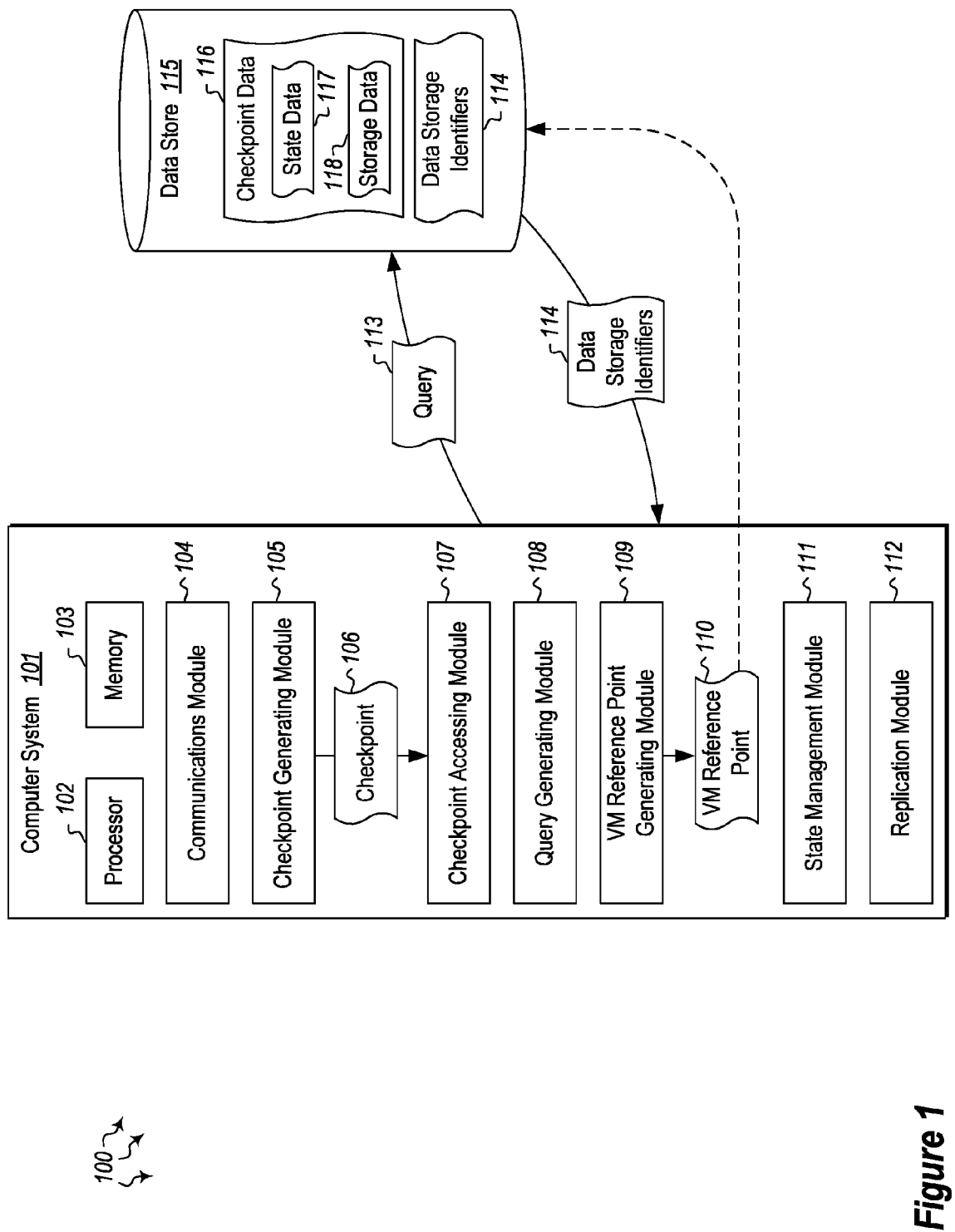
FIG. 1 illustrates a computer architecture in which embodiments described herein may operate including establishing efficient virtual machine reference points.

Embodiments described herein are directed to establishing efficient virtual machine reference points and to specifying a virtual machine reference point to query incremental changes. In one embodiment, a computer system accesses a stable virtual machine checkpoint that includes portions of underlying data stored in data storage, where the checkpoint is associated with a specific point in time. The computer system then queries the data storage to determine data storage identifiers that reference the point in time associated with the checkpoint and stores the determined data storage identifiers as a virtual machine reference point, where each subsequent change to the data storage results in an update to the data storage identifier, so that virtual machine reference point is usable to identify incremental changes from specific points in time on.

In another embodiment, a computer system performs a method for specifying a virtual machine reference point to query incremental changes. The computer system establishes a stable, unchanging state within a virtual machine, where the stable state is associated with a checkpoint that includes corresponding state data and storage data. The computer system accesses previously generated reference points to identify differences in virtual machine state between the current stable state and a selected past stable point in time. The computer system also replicates the differences in virtual machine state between the current stable state and a selected past stable point in time. The differences may be replicated to a data storage device as an incremental backup, or may be used for remote replication or disaster recovery purposes.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The computer system 101 of FIG. 1 may further include a checkpoint generating module 105. The checkpoints 106 (or "snapshots" herein) generated by module 105 may include various portions of corresponding checkpoint data 116 which may be stored in a data store 115. The checkpoint data may include, for example, state data 117 and storage data 118. The state data 117 may include CPU state, memory state and device state for various computer system devices. The storage data 118 may include data files, application files, operating system files, backup files or other data associated with a checkpoint. As such, the checkpoint data 116 associated with a checkpoint 106 includes sufficient data to perform a full restoration or backup from the data. The storage and state data for a given computer system or virtual machine, however, may include a significant amount of data.

In some cases, multiple checkpoints may be stored for a single computer system or virtual machine (VM). Each checkpoint may be generated at a different point in time. Then, once two or more checkpoints have been generated, they can be compared to one another to determine the differences between them. These differences can be applied to a differential backup which only backs up the differences between the two checkpoints. Embodiments described herein introduce the concept of a "reference point", "virtual machine reference point" or "VM reference point." A VM reference point allows previous storage, memory and device state associated with a checkpoint to be deleted while still retaining the ability to create the differential backup. This is done by recording sequence numbers for state transitions.

Incremental backups of virtual machines involve tracking those changes to virtual machine storage that have occurred since a previous specified point in time (or points in time) of the VM. Traditionally, a point in time snapshot of a VM is represented by VM checkpoints. As mentioned above, storing full checkpoints may introduce a lot of overhead on the I/O throughput of the VM, as copy-on-write (or similar) techniques are often used to maintain a point-in-time image of the virtual storage. Maintaining VM checkpoints just for the purpose of referring to previous points in time for querying incremental changes is wasteful in terms of resource usage and negatively impacts performance of applications running in a VM.

The VM reference points described herein do not need to maintain exact point-in-time images of the VM state (e.g. storage, memory, device state). The VM reference points provide a representation of a previous instance in time of the VM. The reference points can be represented by unique identifiers (which can be globally unique identifiers (GUIDs), sequence numbers, or other identifiers.

In one embodiment, a VM reference point (e.g. 110 of FIG. 1) is generated in the following manner: First, a point-in-time image (checkpoint 106) is generated for a VM. This provides a stable copy to back up from. Along with creation of this image, a mechanism to track changes to the virtual storage is triggered. The triggering mechanism may be based on user interaction, input from an application or other source, or can be a manual trigger. Second, once the computer system or VM is backed up, the checkpoint is converted/demoted to a reference point (i.e. just a point-in-time representation that is not backed up by corresponding machine state). This frees up the overhead associated with a checkpoint while allowing tracking of the point in time that was last backed up. Third, during the next backup, a user may specify the reference point to query the incremental changes to the VM that occurred since the specified point in time.

The VM reference point 110 includes minimal metadata which enables querying incremental changes to the virtual storage devices since the point in time represented by the reference point. An example change tracking technique involves the virtual storage subsystem to maintaining a list of changed blocks across discrete points in time represented by sequence numbers. In such a system, the VM reference point for that VM would just include the sequence numbers of the virtual storage devices corresponding to that discrete point in time. The sequence numbers would be incremented each time a memory register changes. As the sequence numbers correspond to a point in time for a checkpoint, when data is written to disk, the sequence number is increased for each memory block that is written to. At least in some embodiments, the sequence numbers are the only thing stored in the VM reference point.

When a VM checkpoint (e.g. 106) is converted to a VM reference point (e.g. 110), the system releases all (or substantially all) of the resources that have been used to maintain a point-in-time image of the VM checkpoint. For instance, in one scenario, the system can free up the differencing virtual hard disks used to maintain the point-in-time image of a checkpoint, eliminating the overhead of performing I/O on a differencing virtual hard disk (VHD). This overhead VM state data is replaced by a metadata about the reference point. The reference point metadata only contains identifiers (e.g. sequence numbers) corresponding to the points in time for the virtual hard disks. This enables the reference point to be used later to query the incremental changes from this point in time.

As such, in FIG. 1, once the checkpoint generating module 105 has generated a checkpoint 106 for a physical or virtual computer system, the query generating module 108 generates a query 113 to identify which data storage identifiers 114 reference the point in time associated with checkpoint 106. These data storage identifiers 114 are sent to the computer system 101 and implemented by the VM reference point generating module 109 to generate a VM reference point 110. It should be understood here that the data store 115 may be internal to or external to computer system 101, and may include a single storage device (e.g. a hard disk or an optical disk) or may include many storage devices and, indeed, may include storage networks such as cloud storage networks. Thus, the data transfers for the query 113 and the data storage identifiers 114 may be internal (e.g. over hardware buses) or may be external over a computer network.

The VM reference point 110 thus includes those data storage identifiers that point to a specific point in time. Each subsequent change to the data storage results in an update to the data storage identifier. As such, the virtual machine reference point 110 is usable to identify incremental changes from specific points in time on. These concepts will be explained further below with regard to methods 200 and 300 of FIGS. 2 and 3, respectively, as well as the embodiments illustrated in FIG. 4.

Figure 2:
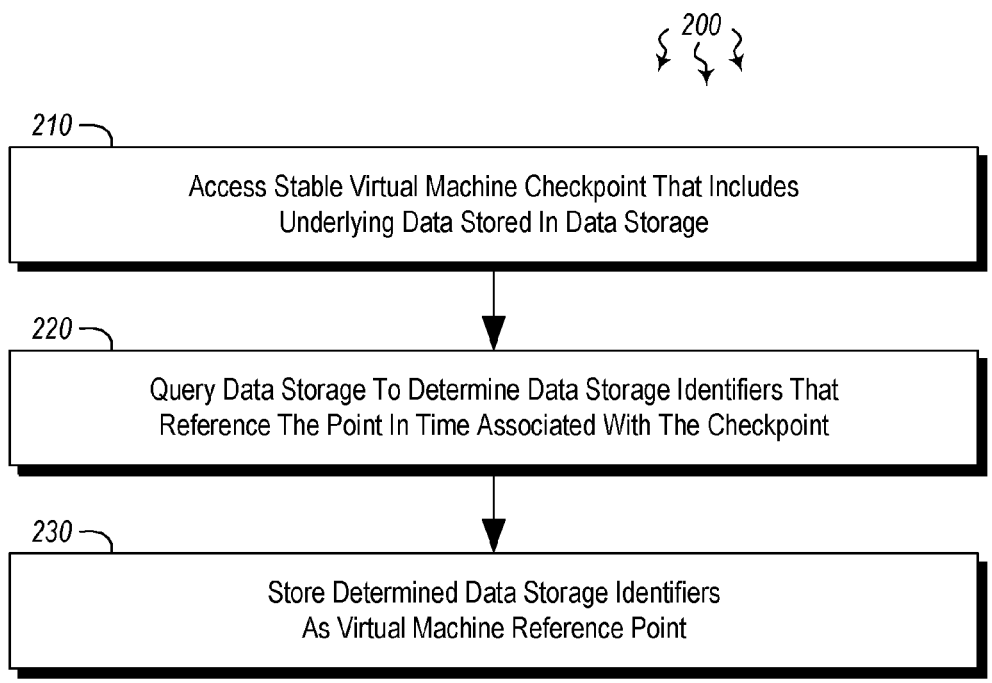
FIG. 2 illustrates a flowchart of an example method for establishing efficient virtual machine reference points.
Figure 3:
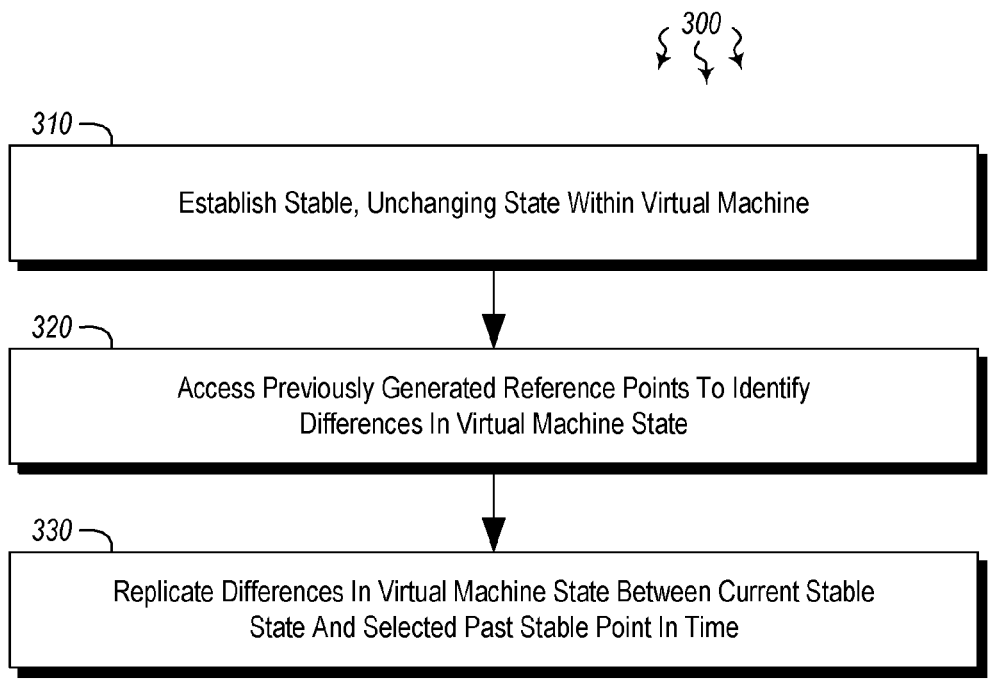
FIG. 3 illustrates a flowchart of an example method for specifying a virtual machine reference point to query incremental changes.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for establishing efficient virtual machine reference points. The method 200 will now be described with frequent reference to the components and data of environment 100.

Method 200 includes accessing a stable virtual machine checkpoint that includes one or more portions of underlying data stored in data storage, the checkpoint being associated with a specific point in time (210). For example, checkpoint accessing module 107 may access checkpoint 106. The checkpoint 106 may be generated based on a running computer system or virtual machine. The checkpoint may include operating system files, application files, registry files, data files or any other type of data including data currently stored in RAM or other memory areas. The checkpoint 106 thus has different state data 117 and storage data 118 in its underlying checkpoint data 116. The checkpoint data 116 may be stored in data store 115 or in some other data store. The data store may include optical storage, solid state storage, magnetic storage or any other type of data storing hardware.

Method 200 next includes querying the data storage to determine one or more data storage identifiers that reference the point in time associated with the checkpoint (220) and storing the determined data storage identifiers as a virtual machine reference point, wherein each subsequent change to the data storage results in an update to the data storage identifier, such that virtual machine reference point is usable to identify incremental changes from specific points in time on (230). For example, the query generating module 108 may generate query 113 which queries the data store 115 to determine which data storage identifiers reference the point in time associated with the checkpoint 106. These data storage identifiers 114 are then stored as a virtual machine reference point 110. The VM reference point generating module 109 may thus access an existing checkpoint and demote it or convert it down from a checkpoint that is fully backed by state data 117 and storage data 118 to a VM reference point that includes only identifiers. In some cases, these identifiers may simply be sequence numbers of a storage device. There may be multiple data storage identifiers for a single disk, or only a data storage identifier for a disk. These concepts may be better understood with a reference to computing architecture 400 of FIG. 4. It will be understood, however, that the example shown in FIG. 4 is only one embodiment, and that many different embodiments may be implemented.

Figure 4:
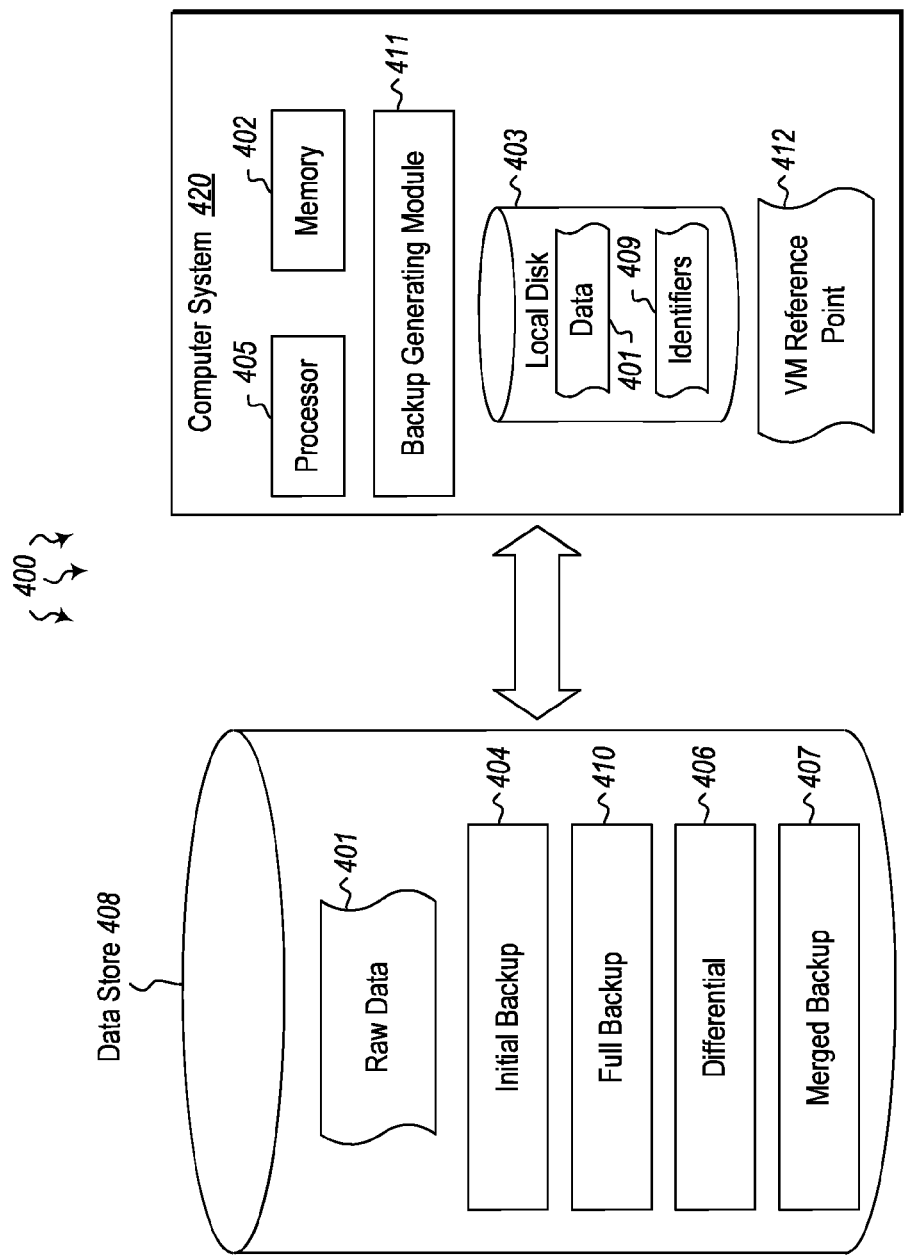
FIG. 4 illustrates a computer architecture in which embodiments may operate including specifying a virtual machine reference point to query incremental changes.

FIG. 4 illustrates a computing system 420 that allows each subsequent change to the data storage to result in an update to the data storage identifier 409 and thereby allows a virtual machine reference point to be usable to identify incremental changes from specific points in time on. For example, assume the raw data 401 of FIG. 4 is stored in different data blocks in a data store (e.g. data store 408 of FIG. 4). The raw data 401 may be stored locally on local disk 403, or may be stored on an external data store. This data is backed up (e.g. by backup generating module 411) in an initial backup 404 and stored as a full backup 410. The full backup 410 thus includes each block of the raw data 401. This is similar to creating a checkpoint 106, where all of the checkpoint's data 116 is stored in data store 115.

Portions of the raw data 401 may be currently in memory 402 and other portions may be on disk 403. Since no changes have been made since the full backup 410, the memory and disk are empty. When changes are made, those changes appear in the raw data 401. This could be analogous of any change to a data file, operating system file or other data on the physical or virtual machine. Memory blocks in memory 402 that include updated data may be marked with a "1" or other changed block data identifiers 409. Again, it will be understood that while sequential numbers are used as identifiers in this example, substantially any type of identifiers may be used including user-selected names, GUIDs, bitmaps or other identifiers. These identifiers are associated with a point in time. Then, using this point in time, virtual machine reference points may be used to identify incremental changes that point in time on.

If additional changes that are made to the raw data 401 at a later point in time, the memory 402 and on disk identifiers would indicate that new changes have occurred. The identifier (e.g. "1") indicates that the block of memory changed at the first point in time, and a "2" may indicate that the block of memory has changed at the second point in time. If a block of memory includes a "1, 2" identifier, that may indicate that that block of memory changes at both the first point in time and the second point in time. If a power failure were to occur at this point, the data on disk would likely be saved, while anything in memory (e.g. in RAM) would be lost.

If a backup were to be performed at this stage, in light of the power failure, the raw data 401 would be backed up as a differential 406, and would include all of the data in the changed data block at the second point in time (as indicated by identifier "2"). As such, the differential 406 would include the data changes that have occurred since the full backup, and a full, merged backup 407 would include the differential 406 combined with the full backup 410. The reference point does not need to maintain an exact point in time image of the physical or virtual machine state (e.g. storage, memory, device state). It is just a representation of a previous instance in time of the physical or virtual machine. Using this VM reference point 412, data backups can be performed, data migrations can be performed, data recovery and other data-related tasks can be performed.

In some embodiments, the state management module 111 of FIG. 1 may be used to establish, at a current time, a stable, unchanging state within the virtual machine. The stable, unchanging state means that all appropriate buffers have been cleared, that no transactions are pending and that the state is not subject to change. The stable state may be established by performing any of the following: buffering subsequent data changes within the virtual machine, implementing temporary copy-on-write for subsequent data changes within the virtual machine, and generating a checkpoint for the virtual machine that includes one or more portions of underlying data.

This stable state is then associated with a virtual machine reference point 110 that includes data storage identifiers 114 corresponding to specific stable points in time (such as the current point in time). The computer system 101 may then access previously generated virtual machine reference points to identify differences in virtual machine state between the current stable state and a selected past, stable point in time, and perform at least one operation using data identified by the stored data storage identifiers and the current data storage identifiers 114. As mentioned above, these data-related tasks may include backing data up, restoring data, replicating data, and providing data to a user or other specified entity such as a third party service or client.

The data identified by the stored data storage identifiers as well as the current data storage identifiers may be combined with a previously generated checkpoint (initial backup 404) where data storage identifiers are used to combine data identified by the stored data storage identifiers and the initial backup 404. In this manner, a differential backup may be provided simply using data storage identifiers to update state changes.

In some embodiments, application programming interfaces (APIs) may be provided which allow third parties to store data storage identifiers as virtual machine reference points. In this manner, VM reference point functionality may be extended to third parties in a uniform fashion. These VM reference points may refer to full backups as well as incremental backups. Using these APIs, multiple vendors may perform data backups simultaneously. Each VM reference point (e.g. 110) comprises metadata that includes the data storage identifiers 114. As such, the virtual machine reference point is lightweight and is not backed by checkpoint data 116 including data storage, memory, or virtual machine state. In some cases, the VM reference point may be converted from a checkpoint and as such, may go from having data storage, memory, or virtual machine state as a checkpoint to having only metadata that includes data storage identifiers.

In some cases, a data-backed checkpoint may be reconstructed using changes identified between the virtual machine reference point 110 and a future point in time. For instance, the computer system 101 may use a VM reference point plus a change log (with pure metadata that describes what changed, not the data itself) to create full checkpoint by fetching data from service that is monitoring changes. Still further, at least in some cases, if a virtual machine is migrated, the virtual machine reference point information may be transferred along with the VM. As such, if the virtual machine is moved to a different computing system, the data identified by the virtual machine reference point is recoverable at the new computing system. Accordingly, various embodiments are described in which a VM reference point may be created and used to back up data.

FIG. 3 illustrates a flowchart of a method 300 for specifying a virtual machine reference point to query incremental changes. The method 300 will now be described with frequent reference to the components and data of environment 100 of FIG. 1.

Method 300 includes establishing a stable, unchanging state within a virtual machine, the stable state being associated with a checkpoint that includes corresponding state data and storage data (310). For example, the state management module 111 of FIG. 1 may establish a stable, unchanging state within a virtual machine. The stable state may be associated with checkpoint 106 which includes corresponding state data 117 and storage data 118. The stable state may be established by buffering any subsequent data changes within the virtual machine, by implementing temporary copy-on-write for subsequent data changes within the virtual machine so that all subsequent data changes are stored and/or by generating a checkpoint for the virtual machine that includes underlying checkpoint data 116.

Method 300 further includes accessing one or more previously generated reference points to identify one or more differences in virtual machine state between the current stable state and a selected past stable point in time (320) and replicating the differences in virtual machine state between the current stable state and a selected past stable point in time (330). The computer system 101 may be configured to access VM reference points 110 to identify differences in VM state between the established stable state and another stable point in time, as identified by the data storage identifiers of the VM reference point. The replication module 112 of computer system 101 may then replicate the identified differences between the current stable state and the selected past stable point in time. These replicated differences may form an incremental backup. This incremental backup may be used for remote replication, disaster recovery or other purposes.

In some embodiments, the computer system 101 may be configured to buffer any data changes that occur while the differences in virtual machine state are determined. Then, once the differences in VM state have been determined, the differences can be merged with the buffered data into a live virtual machine state that includes data backed up from the selected point in time. This allows a user to select substantially any past stable point in time (since the creation of a checkpoint) and determine the state at that point, and merge it with current state to form a live virtual machine that includes data backed up from the selected point in time. The selected past stable point in time may thus include any available previous stable point in time represented by a virtual machine reference point—it does not have to be the immediately previous reference point.

A differencing virtual hard drive may be configured to keep track of the data changes that occur while the differences in virtual machine state are determined. It should also be noted that the establishing, accessing and replicating steps 310, 320 and 330 of Method 300 may each continue operating during storage operations including during the creation of a checkpoint. Thus, while live storage operations are being performed, embodiments herein may still establish a stable state, access a previously generated checkpoint and replicate differences in VM state between a current state and a selected past stable state.

In the embodiment described above, with reference to FIG. 4, sequence numbers are used as data storage identifiers. In some cases where sequence numbers are used in this manner, separate sequence numbers may be assigned to each physical or virtual disk that is associated with the virtual machine. As such, reference points may be created for multiple disks, including disks that are out of synch. The resilient change tracking understands the sequence numbers and can create usable VM reference points for many disks simultaneously. Each VM reference point has the sequence numbers that refer to the changes made for that disk. For multiple disks that are out of synch (e.g. added at different times), each disk may have its own sequence (reference) numbers but the VM reference point tracks sequence numbers for all disks of a VM. Any data associated with a checkpoint may be moved to recovery storage so that the data does not have to sit on the production server. This reduces load on the production server, and increases its ability to more efficiently process data.

In one embodiment, a computer system is provided which includes at least one processor. The computer system performs a computer-implemented method for establishing efficient virtual machine reference points, where the method includes the following: accessing a stable virtual machine checkpoint 106 that includes one or more portions of underlying data 116 stored in data storage 115, the checkpoint being associated with a specific point in time, querying the data storage to determine one or more data storage identifiers 114 that reference the point in time associated with the checkpoint 106, and storing the determined data storage identifiers as a virtual machine reference point 110, wherein each subsequent change to the data storage results in an update to the data storage identifier, such that virtual machine reference point is usable to identify incremental changes from specific points in time on.

The method further includes establishing, at a current time, a stable, unchanging state within the virtual machine, the stable state being associated with a virtual machine reference point that includes one or more data storage identifiers corresponding to specific stable points in time, accessing one or more previously generated virtual machine reference points to identify one or more differences in virtual machine state between the current stable state and a selected past, stable point in time, and performing at least one operation using data identified by the stored data storage identifiers and the current data storage identifiers.

In some cases, the at least one operation includes one or more of the following: backing data up, restoring data, replicating data, and providing data to a user or other specified entity. The data identified by the stored data storage identifiers and the current data storage identifiers is combined with a previously generated checkpoint. The stable state is established by performing at least one of the following: buffering subsequent data changes within the virtual machine, implementing temporary copy-on-write for subsequent data changes within the virtual machine, and generating a checkpoint for the virtual machine that includes one or more portions of underlying data.

In some cases, one or more provided application programming interfaces (APIs) allow multiple different third parties to store data storage identifiers as virtual machine reference points. The virtual machine reference point includes metadata that includes the data storage identifiers, such that the virtual machine reference point is lightweight and is not backed by checkpoint data including data storage, memory, or virtual machine state. A virtual machine checkpoint that includes data storage, memory and virtual machine state is converted to a virtual machine reference point that solely includes metadata. Furthermore, a data-backed checkpoint is reconstructed using one or more identified changes between the virtual machine reference point and a future point in time.

In another embodiment, a computer system is provided which includes at least one processor. The computer system performs a computer-implemented method for specifying a virtual machine reference point to query incremental changes, where the method includes the following: establishing a stable, unchanging state within a virtual machine, the stable state being associated with a checkpoint 106 that includes corresponding state data 117 and storage data 118, accessing one or more previously generated reference points 110 to identify one or more differences in virtual machine state between the current stable state and a selected past stable point in time, and replicating the differences in virtual machine state between the current stable state and a selected past stable point in time.

In some cases, the selected past stable point in time comprises any available previous stable point in time represented by a virtual machine reference point. Still further, a differencing virtual hard drive keeps track of the data changes that occur while the differences in virtual machine state are determined. The data storage identifiers comprise sequence numbers, which are incremented each time a memory register changes.

In still another embodiment, a computer system is provided which includes the following: one or more processors, a checkpoint accessing module 107 for accessing a stable virtual machine checkpoint 106 that includes one or more portions of underlying data 116 stored in data storage 115, the checkpoint being associated with a specific point in time, a query generating module 108 for generating a query 113 that queries the data storage to determine one or more data storage identifiers 114 that reference the point in time associated with the checkpoint, and a virtual machine reference point generating module 109 for storing the determined data storage identifiers as a virtual machine reference point 110, wherein each subsequent change to the data storage results in an update to the data storage identifier, such that virtual machine reference point is usable to identify incremental changes from specific points in time on. Virtual machine reference point information is transferred along with the virtual machine, such that if the virtual machine is moved to a different computing system, the data identified by the virtual machine reference point is recoverable.

Accordingly, methods, systems and computer program products are provided which establish efficient virtual machine reference points. Moreover, methods, systems and computer program products are provided which specify a virtual machine reference point to query incremental changes.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computer system including at least one processor, a computer-implemented method for establishing a virtual machine reference point, the method comprising:
   maintaining a plurality of data storage identifiers that identify changed data blocks of a plurality of data blocks of a data storage corresponding to a virtual machine;
   accessing a stable virtual machine checkpoint comprising a restorable image of a virtual machine at a point in time, and that stores a representation of data of at least one of the plurality of data blocks of the data storage as it existed at the point in time;
   converting the virtual machine checkpoint to a virtual machine reference point comprising a representation of the virtual machine at the point in time, wherein virtual machine reference point information is transferrable along with the virtual machine, such that if the virtual machine is moved to a different computing system, any data identified by the virtual machine reference point is recoverable, converting including:
      querying the data storage to determine at least one data storage identifier corresponding to the at least one data block of the virtual machine checkpoint at the point in time;
      storing the determined at least one data storage identifier as a part of the virtual machine reference point; and
      releasing the representation of the data of the at least data block from the virtual machine checkpoint; and
   subsequent to converting the virtual machine checkpoint to the virtual machine reference point, using the virtual machine reference point to identify one or more changes in the plurality of data blocks of the data storage since the point in time.

2. The method of claim 1, further comprising:
   establishing a stable, unchanging state within the virtual machine, the stable state being associated with the virtual machine reference point;
   accessing one or more previously generated virtual machine reference points to identify one or more differences in virtual machine state between the current stable state and a selected past, stable point in time; and
   performing at least one operation using data identified by the stored data storage identifiers and the current data storage identifiers.

3. The method of claim 2, wherein the at least one operation includes one or more of the following: backing data up, restoring data, replicating data, or providing data to a user or other specified entity.

4. The method of claim 2, wherein the data identified by the stored data storage identifiers and the current data storage identifiers is combined with a previously generated checkpoint.

5. The method of claim 2, wherein the stable state is established by performing at least one of the following: buffering subsequent data changes within the virtual machine, implementing temporary copy-on-write for subsequent data changes within the virtual machine, or generating a checkpoint for the virtual machine that includes one or more portions of underlying data.

6. The method of claim 1, further comprising providing one or more application programming interfaces (APIs) that allow multiple different third parties to store data storage identifiers as virtual machine reference points.

7. The method of claim 6, wherein the multiple third parties are enabled to perform data backups simultaneously using the one or more provided APIs.

8. The method of claim 1, wherein the data storage identifiers comprise at least one of sequence numbers or bitmaps.

9. The method of claim 1, wherein the virtual machine reference point comprises metadata that includes the at least one data storage identifier, such that the virtual machine reference point is lightweight and lacks checkpoint data of the virtual machine checkpoint including data storage, memory, or virtual machine state.

10. The method of claim 9, wherein a virtual machine checkpoint comprising data storage, memory and virtual machine state is converted to a virtual machine reference point that solely includes metadata.

11. The method of claim 1, wherein a data-backed checkpoint is reconstructed using one or more identified changes between the virtual machine reference point and a future point in time.

12. A computer system, comprising:
   one or more processors; and
   one or more computer-readable media having stored thereon computer-executable instructions that are executable by the one or more processors to cause the computer system to establish a virtual machine reference point, the computer-executable instructions including instructions that are executable to cause the computer system to perform at least the following:
      maintain a plurality of data storage identifiers that identify changed data blocks of a plurality of data blocks of a data storage corresponding to a virtual machine;
      access a stable virtual machine checkpoint comprising a restorable image of a virtual machine at a point in time, and that stores a representation of data of at least one of the plurality of data blocks of the data storage as it existed at the point in time;

convert the virtual machine checkpoint to a virtual machine reference point comprising a representation of the virtual machine at the point in time, wherein virtual machine reference point information is transferrable along with the virtual machine, such that if the virtual machine is moved to a different computing system, any data identified by the virtual machine reference point is recoverable, converting including:
- querying the data storage to determine at least one data storage identifier corresponding to the at least one data block of the virtual machine checkpoint at the point in time;
- storing the determined at least one data storage identifier as a part of the virtual machine reference point; and
- releasing the representation of the data of the at least data block from the virtual machine checkpoint; and
- subsequent to converting the virtual machine checkpoint to the virtual machine reference point, use the virtual machine reference point to identify one or more changes in the plurality of data blocks of the data storage since the point in time.

13. The computer system of claim 12, wherein the data identified by the stored data storage identifiers and the current data storage identifiers is combined with a previously generated checkpoint.

14. The computer system of claim 12, wherein the stable state is established by performing at least one of the following: buffering subsequent data changes within the virtual machine, implementing temporary copy-on-write for subsequent data changes within the virtual machine, or generating a checkpoint for the virtual machine that includes one or more portions of underlying data.

15. The computer system of claim 12, wherein the data storage identifiers comprise at least one of sequence numbers or bitmaps.

16. The computer system of claim 12, wherein the virtual machine reference point comprises metadata that includes the at least one data storage identifier, such that the virtual machine reference point is lightweight and lacks checkpoint data of the virtual machine checkpoint including data storage, memory, or virtual machine state.

17. The computer system of claim 16, wherein a virtual machine checkpoint comprising data storage, memory and virtual machine state is converted to a virtual machine reference point that solely includes metadata.

18. The computer system of claim 12, wherein a data-backed checkpoint is reconstructed using one or more identified changes between the virtual machine reference point and a future point in time.

19. The computer system of claim 12, wherein the at least one operation includes one or more of the following: backing data up, restoring data, replicating data, or providing data to a user or other specified entity.

20. A computer program product comprising one or more hardware storage devices having stored thereon computer-executable instructions that are executable by one or more processors to cause a computer system to establish a virtual machine reference point, the computer-executable instructions including instructions that are executable to cause the computer system to perform at least the following:
- maintain a plurality of data storage identifiers that identify changed data blocks of a plurality of data blocks of a data storage corresponding to a virtual machine;
- access a stable virtual machine checkpoint comprising a restorable image of a virtual machine at a point in time, and that stores a representation of data of at least one of the plurality of data blocks of the data storage as it existed at the point in time;
- convert the virtual machine checkpoint to a virtual machine reference point comprising a representation of the virtual machine at the point in time, wherein virtual machine reference point information is transferrable along with the virtual machine, such that if the virtual machine is moved to a different computing system, any data identified by the virtual machine reference point is recoverable, converting including:
  - querying the data storage to determine at least one data storage identifier corresponding to the at least one data block of the virtual machine checkpoint at the point in time;
  - storing the determined at least one data storage identifier as a part of the virtual machine reference point; and
  - releasing the representation of the data of the at least data block from the virtual machine checkpoint; and
- subsequent to converting the virtual machine checkpoint to the virtual machine reference point, use the virtual machine reference point to identify one or more changes in the plurality of data blocks of the data storage since the point in time.

* * * * *